June 4, 1963  F. R. KOBEE  3,092,366
PNEUMATIC JACK
Filed Sept. 15, 1960

INVENTOR.
Frank R. Kobee

United States Patent Office 3,092,366
Patented June 4, 1963

3,092,366
PNEUMATIC JACK
Frank R. Kobee, 1839 Macomber St., Toledo 6, Ohio
Filed Sept. 15, 1960, Ser. No. 56,256
3 Claims. (Cl. 254—93)

This invention relates to pneumatic jacks and more particularly to pneumatic jacks adapted to remove forms from molds.

Considerable difficulty is encountered when forms or reproductions made of plastic, epoxy resins and the like are to be removed or separated from the mold or pattern over which they are cast. In the present method pressure is applied at the outer edges of the form or reproduction by prying or hammering to lift it from the mold. In this method pressure can only be applied at the outer edges of the mold. Furthermore, while pressure is being applied to the outer edges air can not really flow between the mold and the form, hence, a vacuum is created between the form and the mold making the removal of the form from the mold more difficult. In the present method often the form is damaged or broken while removing it from the mold. With my novel pneumatic jack pressure can be applied at any suitable point or points between the form and the mold to lift the form from the mold. Furthermore air under pressure is permitted to flow from my pneumatic jack to the space between the mold and the form. This flow of air under pressure not only prevents a vacuum from forming but actually applies pressure to the entire surface of the form originally in contact with the mold, thus, aiding in lifting the form from the mold. Hence, my novel pneumatic jacks provide easy and quick removal of forms from molds without danger of damaging the forms.

The primary object of this invention is to provide a pneumatic jack that can be placed at suitable positions on a mold to facilitate the removal of the form made thereon.

Another object of this invention is to provide a pneumatic jack that is flexible so that it can be placed on curved or warped surfaces.

Another object of this invention is to provide a pneumatic jack with an air inlet that is readily accessible after the form is completed.

Another object of this invention is to provide a pneumatic jack that will remain in the desired position while the form is being cast.

Another object of this invention is to provide a pneumatic jack that will remain in contact with the form when it is removed from the mold.

With these and other objects in view my invention consists in the construction, combination and arrangements of the various parts of my novel device as described in the specification, claimed in the claims and shown in the accompanying drawings.

Figure 1:
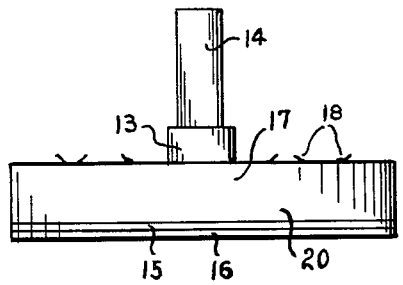
FIGURE 1 is a front elevation of my novel pneumatic jack.
Figure 2:
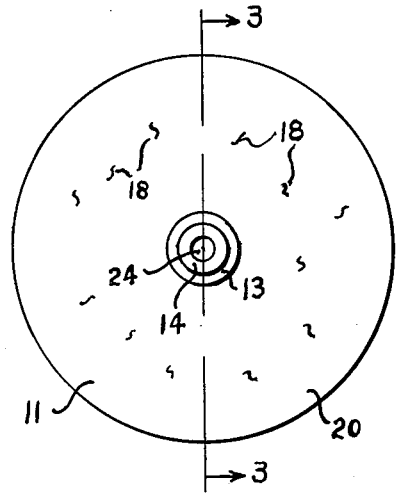
FIGURE 2 is a top plan view of my novel pneumatic jack shown in FIGURE 1.
Figure 3:
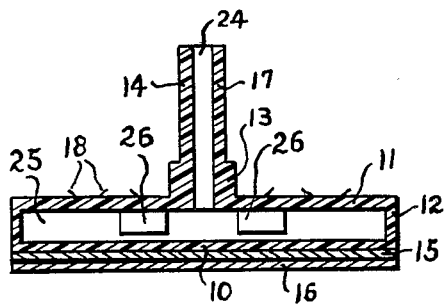
FIGURE 3 is a sectional view taken along line 3—3 of FIGURE 2.
Figure 4:
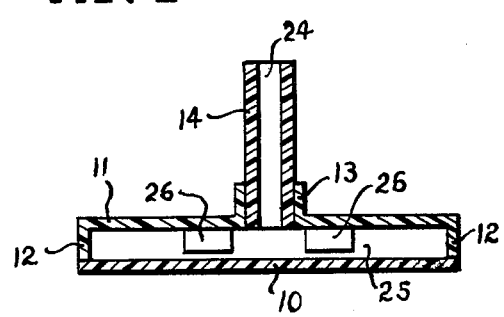
FIGURE 4 is a sectional view of the parts that are fused or vulcanized into a one piece member.

Referring in more detail to the drawings my novel pneumatic jack 20 is provided with a base wall member 10. An upper wall member 11 is provided with a downwarding extending peripheral wall 12 extending to the base wall member 10. An annular flange 13 extends upwardly from the upper wall member 11 and engages an upwardly extending tubular member 14. The above mentioned members may be made of rubber, polyethylene plastic or other flexible material, and are formed into an integral unit 17 as shown in FIGURES 1 and 3 by fusing, vulcanizing, cementing or any other suitable process. FIGURE 4 shows the assembly of the base wall member 10, the upper wall member 11, the peripheral flange 12, the annular flange 13 and the tubular member 14 assembled in position before they are fused, vulcanized, cemented or otherwise formed into an integral unit 17.

A layer of pressure sensitive adhesive 15 is provided on the bottom surface of the base wall member 10. A layer of paper 16 protects the pressure sensitive adhesive 15 while the pneumatic jack is being shipped or otherwise handled.

Figure 5:
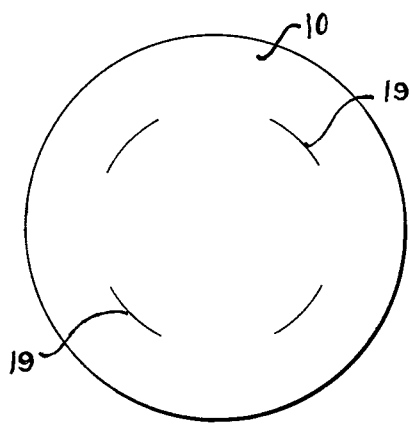
FIGURE 5 is a bottom view of my novel device before the layer of adhesive and paper are applied.

A fibrous material 18 such as metal or glass is bonded to the upper surface of the upper wall member 11. The fibers 18 may be imbedded in the upper wall 11 in the fusing process or they may be secured to the upper wall 11 by a suitable adhesive. The base wall member 10 is provided with slits 19 as shown in FIGURE 5.

When my pneumatic jack is to be used the protective layer of paper 16 is removed from the pressure sensitive adhesive 15. The pneumatic jack is then placed on the mold so that the layer of pressure sensitive adhesive 15 is adjacent the mold. In most instances it is desirable to use a number of pneumatic jacks placed at desirable stations or positions on the mold. The form or casting material is then applied to the mold. The layer of pressure sensitive adhesive 15 retains the pneumatic jack in position while the form is being cast. After the form is cast it is usually covered with a backing material such as plaster.

Figure 6:
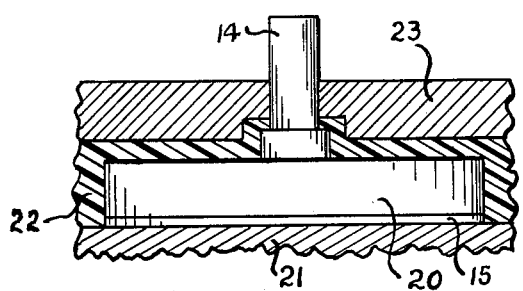
FIGURE 6 is a fragmentary view partially in section showing my novel pneumatic jack in position between the form and the mold after the form has been cast.

FIGURE 6 is a fragmentary view partially in section showing one of my pneumatic jacks 20 in position on the mold 21 with the casting material 22 applied and backed with a layer of plaster 23. The tubular member 14 may be cut off even with the upper edge of the layer of plaster 23 so that air can be fed into the air passage 24.

When the form is to be removed from the mold air under pressure, from a suitable source of supply, is forced through the air passageway 24 into the air chamber 25. Since the bottom wall 10 of the pneumatic jack 20 is flexible pressure will force the bottom wall 10 downward, thus, lifting the form from the mold. As soon as the form tends to lift from the mold air under pressure will pass through the slots 19 into the space between the form and the mold. This air under pressure provides a lifting or separating force on the entire surface of the form. The form is thus easily and readily lifted from the mold without any chance of damaging the form. If several pneumatic jacks are used on the same mold air pressure may be applied to all of the pneumatic jacks at the same time.

The fibrous members 18 become embedded in the casting material when it is applied and keep the pneumatic jack intact with the form when it is removed from the mold. If desired the pneumatic jack can be removed from the form and the resulting cavity can be filled with casting material.

Rib members 26 formed integrally with the upper wall member 11 aid in preventing the pneumatic jack from collapsing while the casting material is applied.

My pneumatic jack may be made in different sizes and shapes. The fibrous material 18 may be replaced by irregular projections formed integrally with the upper wall member 11. The vertical rib members 26 could also be formed integrally with the lower wall member 10 instead of the upper wall member 11.

While I have shown and described one form of my invention, I do not wish to be limited to the particular form shown and described as it will be apparent to those skilled in the art that many modifications therein can be made without departing from the proper scope and fair meaning of the subjoined claims.

What I claim is:

1. A pneumatic jack comprising a flexible upper wall, a substantially flat flexible base wall, a flexible peripheral wall joining said upper wall and said base wall to provide an air chamber therebetween, a tubular member extending upwardly from said upper wall providing an air passageway communicating said air chamber with the atmosphere, a plurality of expansible slits in said base wall and a plurality of irregular projections extending upwardly from said upper wall member.

2. A pneumatic jack comprising a resilient upper wall a substantially flat resilient base wall, a means for joining the outer periphery of said upper wall to the outer periphery of said base wall to provide an air chamber therebetween, a tubular member extending upwardly from said upper wall providing an air passageway communicating said air chamber with the atmosphere, an expansible slit in said base wall and a plurality of fiber members secured to the upper surface of said upper wall and extending therefrom.

3. A pneumatic jack comprising an upper wall, a lower wall substantially parallel to said upper wall, a peripheral wall joining said upper wall and said lower wall to provide an air chamber, a tubular member extending upwardly from said upper wall, an air passageway extending longitudinally in said tubular member communicating with said air chamber and a plurality of fiber members secured to the upper surface of said upper wall.

References Cited in the file of this patent

UNITED STATES PATENTS

| | | |
|---|---|---|
| 2,480,477 | Jones | Aug. 30, 1949 |
| 2,528,643 | Dubbs | Nov. 7, 1950 |
| 2,764,817 | Schwartz | Oct. 2, 1956 |
| 2,765,998 | Engert | Oct. 9, 1956 |

FOREIGN PATENTS

| | | |
|---|---|---|
| 1,021,287 | Germany | Dec. 19, 1957 |